United States Patent
Oshita et al.

(10) Patent No.: US 12,365,339 B2
(45) Date of Patent: Jul. 22, 2025

(54) DRIVING SUPPORT DEVICE

(71) Applicant: Isuzu Motors Limited, Tokyo (JP)

(72) Inventors: Wasantha Oshita, Fujisawa-shi (JP); Masaichi Takahashi, Fujisawa-shi (JP); Shinichiro Fukazawa, Fujisawa-shi (JP)

(73) Assignee: Isuzu Motors Limited, Yokohama (JP)

( * ) Notice: Subject to any disclaimer, the term of this patent is extended or adjusted under 35 U.S.C. 154(b) by 205 days.

(21) Appl. No.: 17/801,536

(22) PCT Filed: Feb. 26, 2021

(86) PCT No.: PCT/JP2021/007393
§ 371 (c)(1),
(2) Date: Aug. 23, 2022

(87) PCT Pub. No.: WO2021/172520
PCT Pub. Date: Sep. 2, 2021

(65) Prior Publication Data
US 2023/0140476 A1    May 4, 2023

(30) Foreign Application Priority Data
Feb. 28, 2020   (JP) .................. 2020-033765

(51) Int. Cl.
*B60W 30/00*   (2006.01)
*B60W 10/18*   (2012.01)
*B60W 30/16*   (2020.01)
*B60W 40/105*  (2012.01)

(52) U.S. Cl.
CPC ............ *B60W 30/16* (2013.01); *B60W 10/18* (2013.01); *B60W 40/105* (2013.01); *B60W 2554/804* (2020.02); *B60W 2720/10* (2013.01)

(58) Field of Classification Search
CPC .... B60W 30/16; B60W 10/18; B60W 40/105; B60W 2554/804; B60W 2720/10
USPC ........................................... 701/93
See application file for complete search history.

(56) References Cited

U.S. PATENT DOCUMENTS

2019/0217861 A1    7/2019   Kurahashi

FOREIGN PATENT DOCUMENTS

| CN | 107097767 | 8/2017 |
| CN | 109866770 | 6/2019 |
| CN | 110371117 | 10/2019 |
| CN | 110816530 | 2/2020 |
| JP | 07-017295 | 1/1995 |
| JP | 2003306053 A | * 10/2003 |
| JP | 2009-113685 | 5/2009 |
| JP | 2016-147506 | 8/2016 |

(Continued)

*Primary Examiner* — Tiffany P Young
*Assistant Examiner* — Michael T Dowling (57) ABSTRACT

A target acceleration/deceleration output unit includes an acceleration/deceleration output unit which outputs an acceleration/deceleration including a deceleration, on the basis of the vehicle-to-vehicle distance from a host vehicle to a preceding vehicle and the relative speed of the host vehicle and the preceding vehicle, and a canceling unit which cancels a deceleration that causes jerking from the deceleration output from the acceleration/deceleration output unit, wherein the acceleration output from the acceleration/deceleration output unit, and the deceleration obtained by the canceling unit are output as a target acceleration/deceleration.

5 Claims, 5 Drawing Sheets

(56) References Cited

FOREIGN PATENT DOCUMENTS

| | | | |
|---|---|---|---|
| JP | 2019-123385 | | 7/2019 |
| KR | 20120053217 A | * | 11/2010 |
| WO | WO 2013/172283 | | 11/2013 |

* cited by examiner

DRIVING SUPPORT DEVICE

TECHNICAL FIELD

The present disclosure relates to a driving assistance apparatus of assisting the driving of a vehicle.

BACKGROUND ART

In recent years, as one technology of assisting the driving of a vehicle, adaptive cruise control (hereinafter referred to as "ACC") has been gathering attention (for example, see Patent Literature (hereinafter, referred to as PTL 1)). The ACC is a technology of obtaining the vehicle speed of a vehicle, the relative speed of a leading vehicle with respect to the vehicle, the inter-vehicle distance between the vehicle and the leading vehicle, and the like, and controlling a driving system and a braking system of the vehicle such that the vehicle speed and the inter-vehicle distance between the vehicle and the leading vehicle are maintained to be constant.

In the ACC, in general, cruise control that controls the speed of own car to a set vehicle speed that is preset is performed when there are no leading cars.

CITATION LIST

Patent Literature

PTL 1
Japanese Patent Application Laid-Open No. HEI 7-17295

SUMMARY OF INVENTION

Technical Problem

The ACC of the related art is not actuated at 40 km/h or less, for example. However, a recent trend is to actuate the ACC even while the vehicle is stopped. Therefore, there is a need to realize ACC that also takes the stoppage of the vehicle into consideration.

Meanwhile, when brake control that stops the vehicle is performed, there is a risk that a jerk may occur. In particular, large cars have heavy vehicle weight, and hence need a strong brake force. As a result, a jerk easily occurs.

However, in the ACC of the related art, the relationship between the target deceleration speed and a jerk has not been sufficiently examined.

The present disclosure has been made in view of the abovementioned points and provides a driving assistance apparatus capable of suppressing a jerk by a simple configuration when ACC is performed.

Solution to Problem

One aspect of a driving assistance apparatus of the present disclosure is an apparatus that assists driving of a vehicle, the driving assistance apparatus comprising:
- an inter-vehicle-distance detection section that detects an inter-vehicle distance between own car and a leading car;
- a relative-speed detection section that detects a relative speed between the own car and the leading car; and
- a target-acceleration/deceleration-speed output section that outputs a target acceleration/deceleration speed of the own car on basis of the inter-vehicle distance and the relative speed, wherein:
  the target-acceleration/deceleration-speed output section includes:
  - an acceleration/deceleration-speed output section that outputs an acceleration/deceleration speed including a deceleration speed on basis of the inter-vehicle distance from the own car to the leading car and the relative speed between the own car and the leading car; and
  - a cancel section that cancels a deceleration speed that causes a jerk to occur from the deceleration speed output from the acceleration/deceleration-speed output section, and wherein
  the target-acceleration/deceleration-speed output section outputs an acceleration speed output from the acceleration/deceleration-speed output section and a deceleration speed obtained by the cancel section, as a target acceleration/deceleration speed.

Advantageous Effects of Invention

According to the present disclosure, the target deceleration speed obtained by canceling the deceleration speed that causes a jerk to occur by the cancel section in advance is output. Therefore, it is possible to suppress a jerk by a simple configuration when the ACC is performed.

BRIEF DESCRIPTION OF DRAWINGS

FIGS. 4A and 4B illustrate a state until the own vehicle stops by performing deceleration control in which

DESCRIPTION OF EMBODIMENTS

One embodiment of the present invention is described in detail below with reference to the accompanying drawings.

<1> Configuration of Vehicle

First, the configuration of a vehicle including a driving assistance apparatus according to one embodiment of the present disclosure is described.

Figure 1:
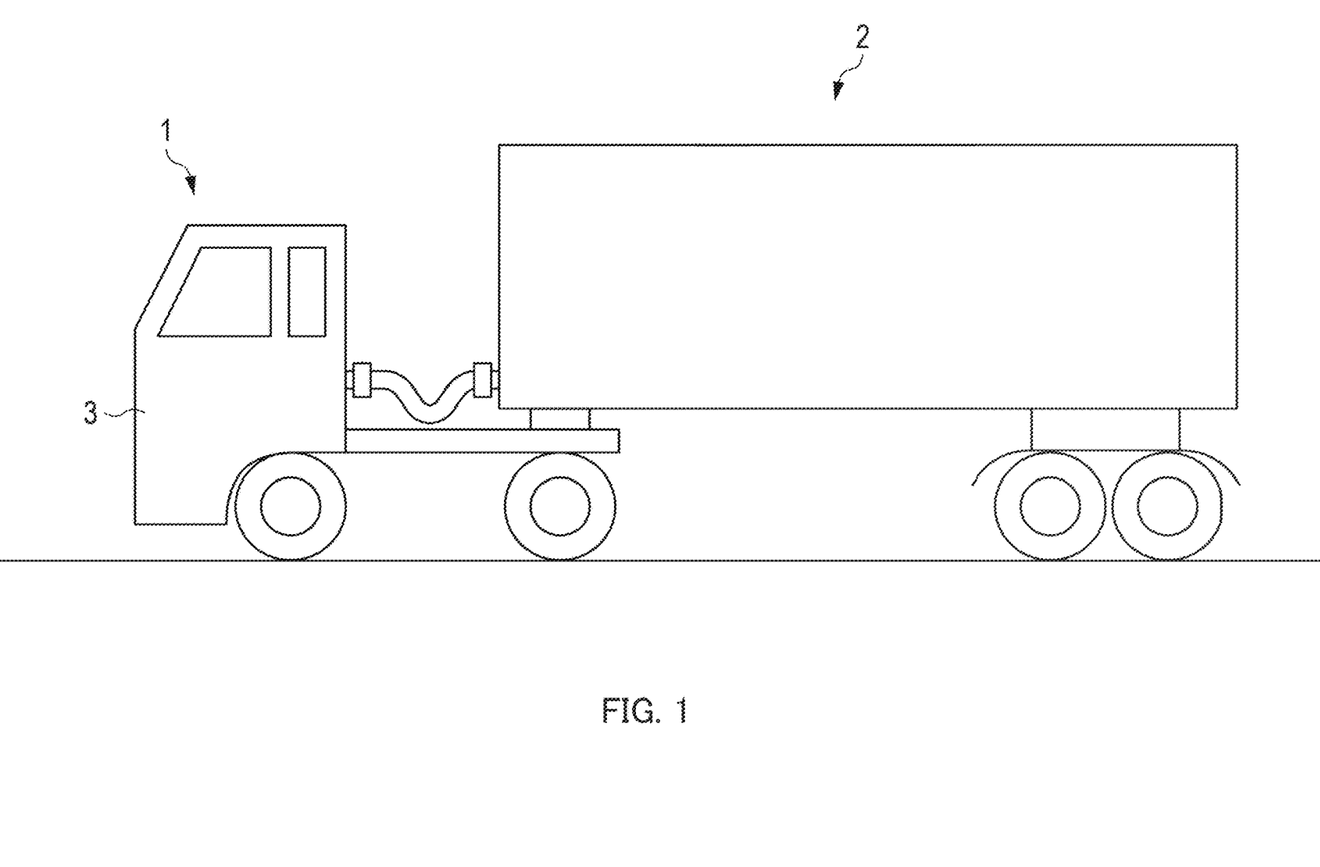
FIG. 1 is an external view illustrating an example of a vehicle to which a driving assistance apparatus according to an embodiment is applied.
Figure 2:
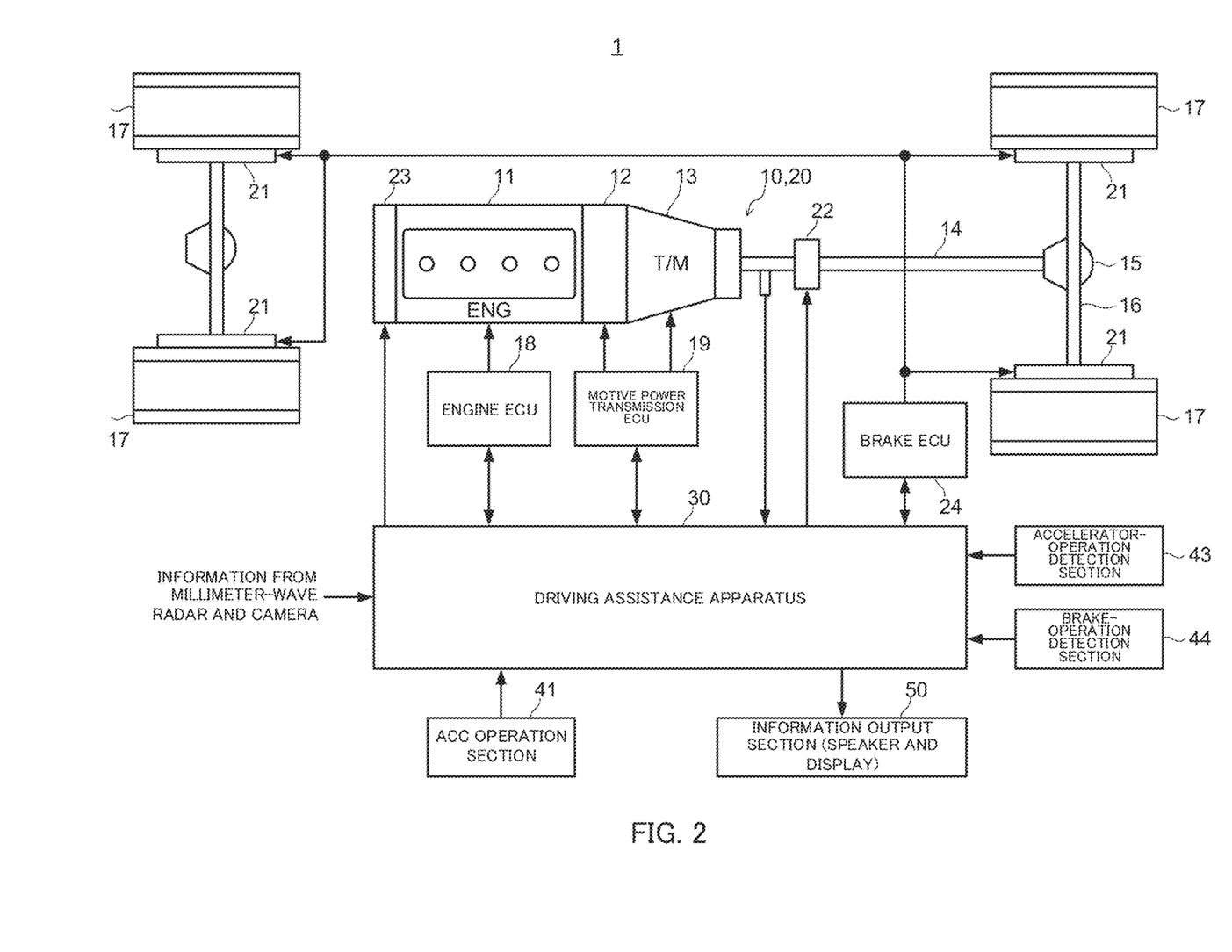
FIG. 2 is a block diagram illustrating the configuration of the vehicle of the embodiment.

FIG. 1 is an external view illustrating an example of vehicle 1 to which a driving assistance apparatus according to the present embodiment is applied. FIG. 2 is a block diagram illustrating the configuration of vehicle 1. Illustration and description are made by focusing on parts relating to the driving assistance apparatus.

As illustrated in FIG. 1, vehicle 1 is a tractor (traction vehicle) capable of towing trailer 2 as a result of coupling trailer 2 to the tractor. Vehicle 1 has vehicle main-body portion 3 including a power system such as an engine and driving wheels and a driver's seat, and trailer 2 coupled to vehicle main-body portion 3.

As illustrated in FIG. 2, vehicle 1 has driving system 10 that causes vehicle 1 to travel, braking system 20 that decelerates vehicle 1, driving assistance apparatus 30 that assists the driving of vehicle 1 by a driver, and the like.

Driving system 10 has engine 11, clutch 12, transmission 13, propeller shaft 14, differential gear 15, drive shaft 16, wheels 17, engine ECU 18, and motive power transmission ECU 19.

Engine ECU 18 and motive power transmission ECU 19 are connected to driving assistance apparatus 30 by an in-vehicle network such as a controller area network (CAN) and are able to transmit and receive necessary data and control signals to and from each other. Engine ECU 18 controls the output of engine 11 in accordance with a drive command from driving assistance apparatus 30. Motive power transmission ECU 19 controls the connection and disconnection of clutch 12 and the speed change of transmission 13 in accordance with a drive command from driving assistance apparatus 30.

The motive power of engine 11 is transmitted to transmission 13 via clutch 12. The motive power transmitted to transmission 13 is further transmitted to wheels 17 via propeller shaft 14, differential gear 15, and drive shaft 16. As a result, the motive power of engine 11 is transmitted to wheels 17, and vehicle 1 travels.

Braking system 20 has service brakes 21, auxiliary brakes 22, 23, a parking brake (not shown), and brake ECU 24.

Service brake 21 is a brake that is generally referred to as a main brake, a friction brake, a foot brake, a foundation brake, or the like. Service brake 21 is a drum brake that obtains braking force by pressing a brake lining against the inner side of a drum that rotates with wheel 17, for example.

Auxiliary brake 22 is a retarder (hereinafter referred to as "retarder 22") that obtains braking force by directly giving load to the rotation of propeller shaft 14, and is an electromagnetic retarder, for example. Auxiliary brake 23 is an exhaust brake (hereinafter referred to as "exhaust brake 23") that increases an effect of an engine brake with use of rotational resistance of the engine. By providing retarder 22 and exhaust brake 23, the braking force can be increased, and the frequency of usage of service brakes 21 is reduced. Therefore, the wear-out of brake lining and the like can be suppressed.

Brake ECU 24 is connected to driving assistance apparatus 30 by an in-vehicle network such as a CAN and is able to transmit and receive necessary data and control signals to and from each other. Brake ECU 24 controls the braking force of service brakes 21 (the brake fluid pressure of wheel cylinders of wheels 17) in accordance with a braking command from driving assistance apparatus 30.

The braking operation of service brakes 21 is controlled by driving assistance apparatus 30 and brake ECU 24. The braking operation of retarder 22 and exhaust brake 23 is controlled by on/off by driving assistance apparatus 30. The braking force of retarder 22 and exhaust brake 23 is substantially fixed. Therefore, when a desired braking force is to be accurately generated, service brakes 21 that can fine-adjust the braking force are suitable.

Information from a millimeter-wave radar and a camera is input to driving assistance apparatus 30. Information from the millimeter-wave radar and the camera is information indicating the traffic situation and the road situation ahead of the vehicle. Driving assistance apparatus 30 has ACC operation section 41, accelerator-operation detection section 43, brake-operation detection section 44, and the like.

Driving assistance apparatus 30 forms control signals for controlling the operation of driving system 10 and braking system 20. In particular, driving assistance apparatus 30 of the present embodiment obtains target acceleration/deceleration speed for realizing ACC and outputs the target acceleration/deceleration speed to engine ECU 18, motive power transmission ECU 19, and brake ECU 24, as appropriate.

Although not shown, each of engine ECU 18, motive power transmission ECU 19, brake ECU 24, and driving assistance apparatus 30 has a central processing unit (CPU), a storage medium such as a read only memory (ROM) in which a control program is stored, a working memory such as a random access memory (RAM), and a communication circuit, for example. In this case, for example, the functions of sections described below constituting driving assistance apparatus 30 are realized by executing control programs by the CPU. All or some of engine ECU 18, motive power transmission ECU 19, brake ECU 24, and driving assistance apparatus 30 may be integrated.

ACC operation section 41 includes an ACC ON/OFF switch for performing ON/OFF control of the operation of the ACC. ACC operation section 41 includes setting switches for setting various settings of the ACC. A driver can set a target inter-vehicle distance and a target own-vehicle speed, for example, by operating the setting switches. Those switches may be realized by a user interface displayed on a display with a touch screen.

Accelerator-operation detection section 43 detects the depression amount of an accelerator pedal and outputs the detection result to driving assistance apparatus 30. Driving assistance apparatus 30 transmits drive commands to engine ECU 18 and motive power transmission ECU 19 on the basis of the depression amount of the accelerator pedal.

Brake-operation detection section 44 detects the depression amount of a brake pedal for operating service brakes 21. Brake-operation detection section 44 detects whether an auxiliary brake lever that causes retarder 22 or exhaust brake 23 to operate has been operated. Brake-operation detection section 44 outputs the detection result relating to the brake pedal and the auxiliary brake lever to driving assistance apparatus 30. Driving assistance apparatus 30 transmits a braking command to brake ECU 24 on the basis of the depression amount of the brake pedal. Driving assistance apparatus 30 controls the ON/OFF operation of retarder 22 or exhaust brake 23 on the basis of the operation of the auxiliary brake lever.

Driving assistance apparatus 30 outputs various information relating to traveling from information output section 50. For example, information output section 50 outputs that sound and display, to thereby indicate that the ACC is being executed or the ACC is being stopped.

<2> Deceleration Control at Time of ACC

Next, deceleration control at the time of the ACC according to the present embodiment is described.

Figure 3:
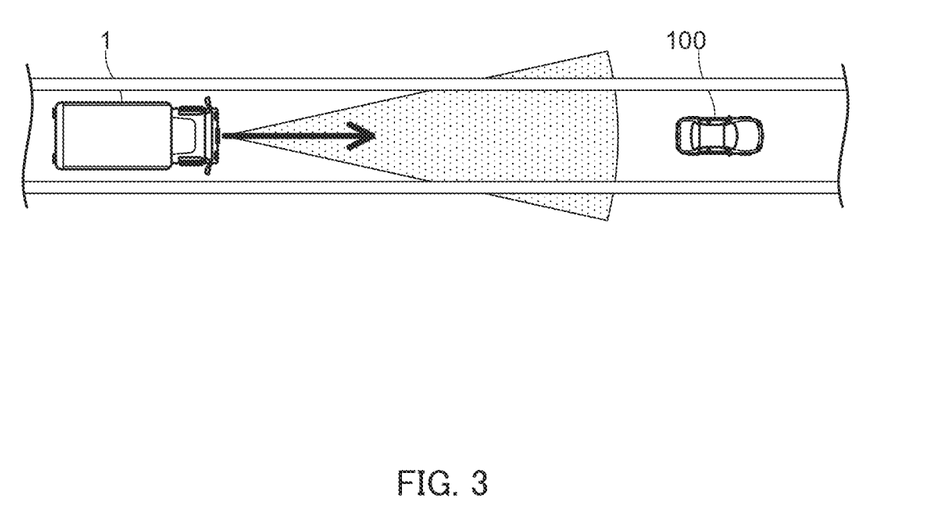
FIG. 3 illustrates a situation where own vehicle during ACC approaches another vehicle that is being stopped.

In the present embodiment, as illustrated in FIG. 3, a situation where own vehicle 1 during the ACC approaches other vehicle 100 that is being stopped is supposed. The shaded pattern in the drawing indicates a detection range by the millimeter-wave radar. As can be seen from the drawing, other vehicle 100 is not a vehicle that own vehicle 1 has been following but is a vehicle that suddenly enters the detection range of the millimeter-wave radar when own vehicle 1 is traveling while the ACC is active.

Figure 4A:
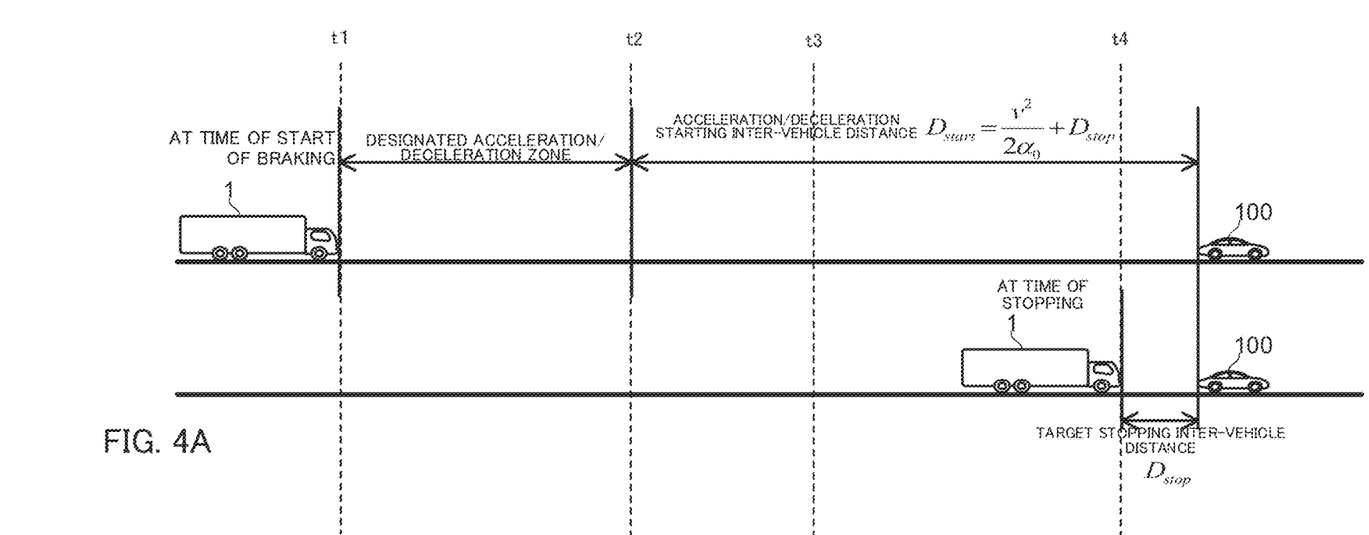
FIG. 4A illustrates the relationship between the own vehicle and the other vehicle until the own vehicle stops and FIG. 4B is a graph showing the relationship between the travel distance and the own car speed from when vehicle-stopping control is started to when the vehicle stops.
Figure 4B:
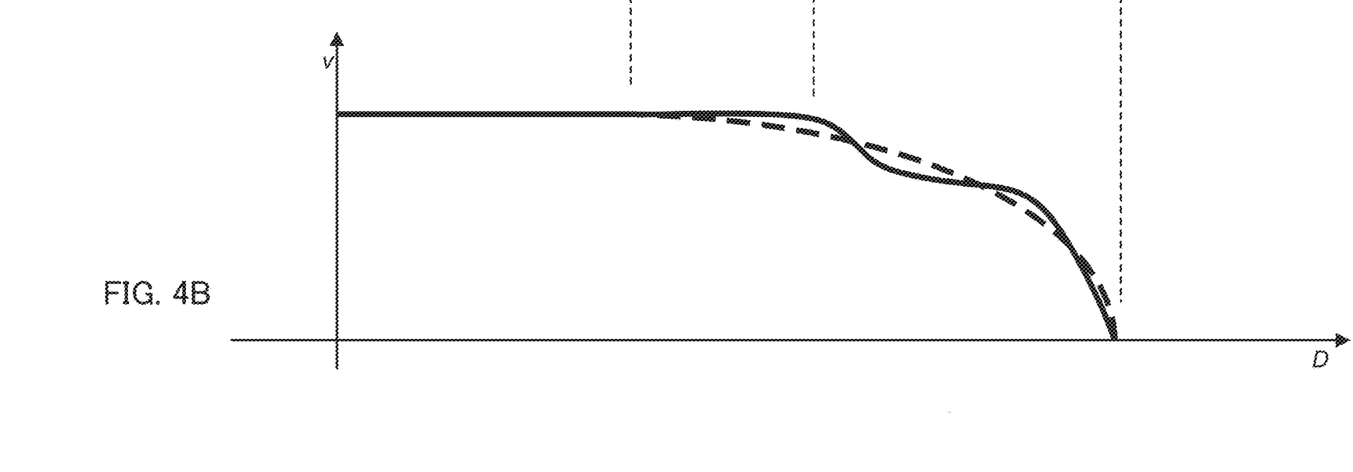

FIGS. 4A and 4B illustrate a state until own vehicle 1 stops by performing deceleration control with respect to such other vehicle 100. FIG. 4A illustrates the relationship between own vehicle 1 and the other vehicle until own vehicle 1 stops and FIG. 4B is a graph showing the relationship between travel distance D and own car speed v from when vehicle-stopping control is started to when the vehicle stops.

Vehicle 1 starts deceleration control at time point t1. In other words, other vehicle 100 has entered the detection range of the millimeter-wave radar at time point t1. A zone from time point t1 to time point t2 is a zone referred to as a designated acceleration/deceleration zone, and vehicle 1 performs traveling at a certain speed or fuel cut in accordance with own vehicle speed v in the zone.

Vehicle 1 eventually outputs basic deceleration speed α0 at time point t2 at which inter-vehicle distance Dstart at which acceleration/deceleration is to be started is reached. Inter-vehicle distance Dstart can be expressed by the following expression, where a target stopping inter-vehicle distance is represented by Dstop, the own vehicle speed is represented by v, and the basic deceleration speed is represented by α0.

$$D\text{start}=(v^2)/(2\alpha 0)+D\text{stop} \quad \text{(Expression 1)}$$

Thus, as indicated by dotted line in FIG. 4B, own vehicle speed v becomes smaller as travel distance D becomes greater, and own vehicle speed v is supposed to reach 0 at time point t4 when target stopping inter-vehicle distance Dstop is reached.

However, in practice, the brake does not start to work from time point t2 at which first basic deceleration speed α0 is output, and starts to work from time point t3 at which a predetermined amount of time has elapsed. This is because there is a mechanical delay before the brake actually starts to work after a control signal is input. For example, in a disc brake, a certain amount of time (normally, an amount of time of about several milliseconds) is needed for the brake to start working as a result of a brake pad being pressed against a disc rotor by oil pressure after a control signal based on the target deceleration speed is input.

As a result, when the ACC control of the related art is performed, the relationship between actual travel distance D and own vehicle speed v will not be the relationship indicated by the dotted line in FIG. 4B, and a jerk occurs in many cases as indicated by the solid line.

In other words, as indicated by the solid line, the brake is not practically working from time point t2 to time point t3. Therefore, at time point t3 at which the brake starts to work, own vehicle speed v hardly changes from time point t2 and only the inter-vehicle distance becomes shorter. Therefore, at time point t3, vehicle 1 outputs deceleration speed α1 greater than basic deceleration speed α0 as the deceleration speed of the ACC.

When an instruction of basic deceleration speed α0 is given when the brake is starting to work, the speed of vehicle 1 slowly decreases as indicated by the dotted line. However, when an instruction of deceleration speed α1 greater than basic deceleration speed α0 is given when the brake is starting to work, own vehicle speed v rapidly decreases as indicated by the solid line. When own vehicle speed v rapidly decreases, the stop position of own vehicle 1 becomes a position behind the target vehicle-stop position. Therefore, in order to prevent the above, a value of which deceleration is small is output as the next deceleration speed, and a zone in which the deceleration is gentle is provided as illustrated by the solid line. In this way, a change in the deceleration speed, that is, a so-called jerk occurs at the time of deceleration.

<3> Configuration and Operation of Driving Assistance Apparatus of Embodiment

Figure 5:
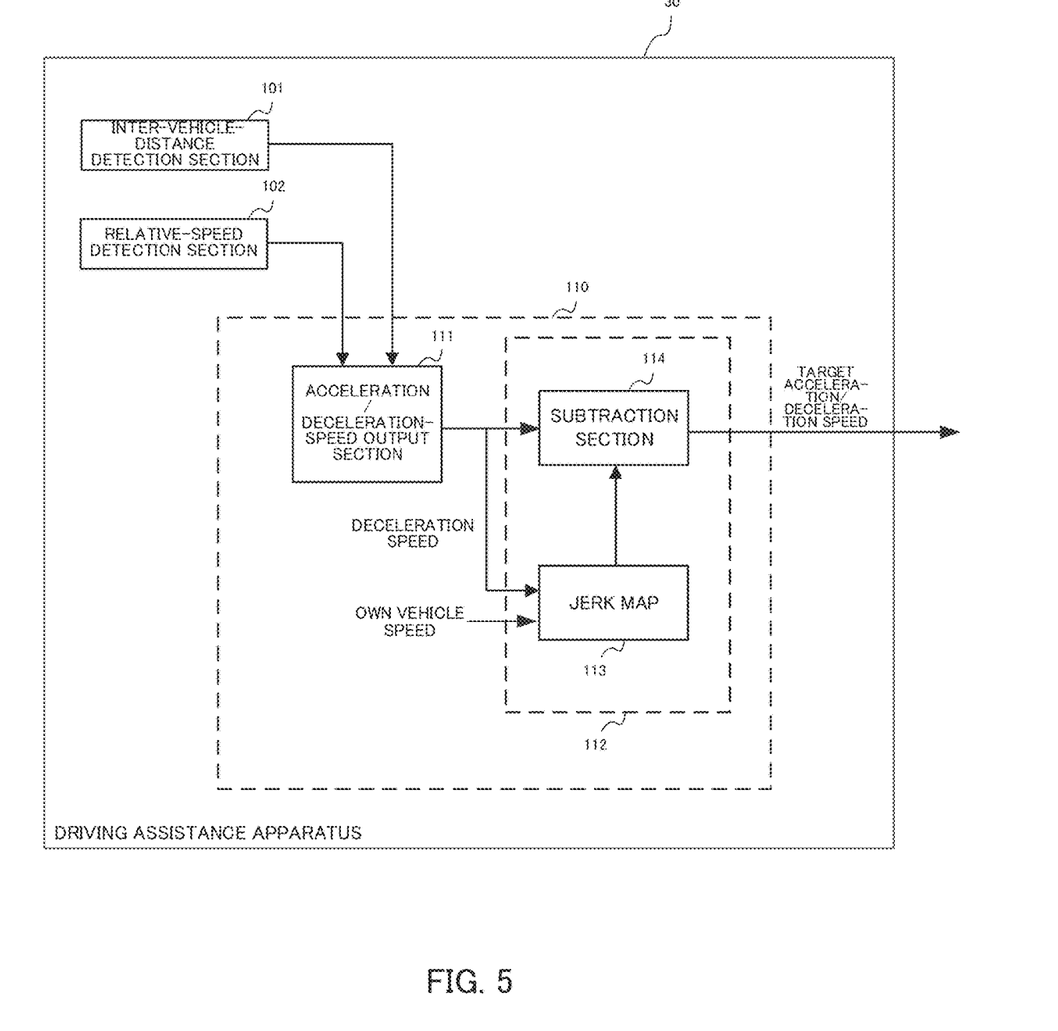
FIG. 5 is a block diagram illustrating the configuration of the driving assistance apparatus according to the embodiment.

FIG. 5 is a block diagram illustrating the configuration of driving assistance apparatus 30 of the present embodiment.

Driving assistance apparatus 30 has inter-vehicle-distance detection section 101, relative-speed detection section 102, and target-acceleration/deceleration-speed output section 110.

Inter-vehicle-distance detection section 101 and relative-speed detection section 102 respectively measure (detect) the inter-vehicle distance and the relative speed between own vehicle 1 and a leading car on the basis of information obtained by the millimeter-wave radar, the camera, and the like, and output the measurement results to target-acceleration/deceleration-speed output section 110. Inter-vehicle-distance detection section 101 and relative-speed detection section 102 may measure inter-vehicle distance and the relative speed on the basis of information from other sensors such as a laser radar.

Target-acceleration/deceleration-speed output section 110 outputs the target acceleration/deceleration speed for causing own car to follow the leading car on the basis of the inter-vehicle distance and the relative speed between the own car and the leading car. As a result, automatic following traveling control is realized. When there are no leading cars, target-acceleration/deceleration-speed output section 110 outputs a target acceleration speed for causing the speed of the own car to be a set certain speed. As a result, constant-speed traveling control is realized.

Automatic-following traveling control is control that operates driving system 10 and braking system 20 such that the inter-vehicle distance is within a predetermined target range and the relative speed approaches zero when a leading vehicle is present in a predetermined range. The constant-speed traveling control is control that operates driving system 10 and braking system 20 such that the traveling speed of vehicle 1 approaches a predetermined target value when there are no leading vehicles in a predetermined range.

Target-acceleration/deceleration-speed output section 110 performs the vehicle-stopping control as that illustrated in FIG. 4A when other vehicle 100 that is being stopped is present ahead. The features of target-acceleration/deceleration-speed output section 110 of the present embodiment are mainly in parts relating to the vehicle-stopping control. Therefore, configurations and operations relating to the vehicle-stopping control are mainly described below.

Target-acceleration/deceleration-speed output section 110 of the present embodiment has acceleration/deceleration-speed output section 111 that outputs the acceleration/deceleration speed including the deceleration speed on the basis of the inter-vehicle distance from the own car to the leading car and the relative speed between the own car and the leading car, and cancel section 112 that cancels at least a deceleration speed that causes a jerk to occur from the deceleration speed output from acceleration/deceleration-speed output section 111 when roughly divided.

In this way, a rapid deceleration when the brake starts to work (time point t3) as that indicated by the solid line in FIG. 4B can be suppressed. As a result, a jerk can be suppressed.

In the case of the present embodiment, cancel section 112 has jerk map 113 and subtraction section 114.

In jerk map 113, the deceleration speed for canceling a jerk that occurs in association with the deceleration speed and the own vehicle speed is stored.

Subtraction section 114 subtracts the deceleration speed output from jerk map 113 from the deceleration speed output from acceleration/deceleration-speed output section 111.

A specific description is made. With regard to the example of FIGS. 4A and 4B described above, at time point t3, deceleration speed $\alpha 1$ is output as the target deceleration speed at the time of own vehicle speed v. As a result, a jerk occurs. Difference $\Delta \alpha$ between the greatest deceleration speed (the expression of "great" in this case means to be great in the deceleration direction) at which a jerk does not occur at the time of own vehicle speed v and deceleration speed $\alpha 1$ is stored in jerk map 113. Difference $\Delta \alpha$ can be obtained by a test in advance. Difference $\Delta \alpha$ can also be obtained from an equation of motion and the like.

In other words, jerk map 113 outputs difference $\Delta \alpha$ when own vehicle speed v is input from a speed sensor (not shown) and deceleration speed $\alpha 1$ is input from acceleration/deceleration-speed output section 111 at time point t3.

Subtraction section 114 subtracts difference $\Delta \alpha$ output from jerk map 113 from deceleration speed $\alpha 1$ output from acceleration/deceleration-speed output section 111. The expression of "subtract" herein means to remove (cancel). As a result, the greatest deceleration speed (the expression of "great" in this case means to be great in the deceleration direction) at which a jerk does not occur at the time of own vehicle speed v is output from subtraction section 114 as the target deceleration speed. The target deceleration speed is transmitted to brake ECU 24 (FIG. 2).

The acceleration speed output from acceleration/deceleration-speed output section 111 is transmitted to brake ECU 24 (FIG. 2) as it is without being subtracted by subtraction section 114.

<4> Effects of Embodiment

As described above, according to the present embodiment, target-acceleration/deceleration-speed output section 110 includes: acceleration/deceleration-speed output section 111 that outputs the acceleration/deceleration speed including the deceleration speed on the basis of the inter-vehicle distance from the own car to the leading car and the relative speed between the own car and the leading car; and cancel section 112 that cancels deceleration speed (difference) $\Delta \alpha$ that causes a jerk to occur from the deceleration speed output from acceleration/deceleration-speed output section 111, and target-acceleration/deceleration-speed output section 110 outputs the acceleration speed output from acceleration/deceleration-speed output section 111 and the deceleration speed obtained by cancel section 112 as the target acceleration/deceleration speed.

As a result, a speed obtained by canceling deceleration speed (difference) $\Delta \alpha$ that causes a jerk to occur by cancel section 112 in advance is output as the target deceleration speed. Therefore, it is possible to suppress a jerk by a simple configuration when the ACC is performed.

The abovementioned embodiment is characterized in that the deceleration speed is adjusted in consideration of the jerk amount. In particular, when stopped vehicle 100 is present ahead during the ACC, for example, a strong brake based on target deceleration speed $\alpha 1$ is excessively applied when the brake starts to work (time point t3), thereby causing a jerk to occur. Thus, in the present embodiment, by removing (canceling) deceleration speed (difference) $\Delta \alpha$ from target deceleration speed $\alpha 1$, the initial brake force is weakened.

<5> Other Embodiments

The abovementioned embodiment is merely an example of a realization for carrying out the present invention, and the interpretation of the technical scope of the present invention is not to be limited by those embodiments. In other words, the present invention can be carried out in various forms without departing from the gist or the main features of the present invention.

<5-1> In the abovementioned embodiment, a case where cancel section 112 is configured by jerk map 113 and subtraction section 114 is described, but the configuration of cancel section 112 is not limited to the above. In short, cancel section 112 only needs to be able to remove the deceleration speed that causes a jerk to occur from the deceleration speed output from acceleration/deceleration-speed output section 111. For example, a certain value may be subtracted from the deceleration speed output from acceleration/deceleration-speed output section 111 such that the deceleration becomes smaller (in other words, the deceleration becomes slower).

<5-2> In addition to the abovementioned embodiment, cancel section 112 may be prohibited from performing cancel processing in case of a downhill slope. In other words, when it is detected by the acceleration speed sensor (not shown) and the like that own vehicle 1 is traveling on a downhill slope, target deceleration speed $\alpha 1$ may be output as it is without removing (canceling) deceleration speed (difference) $\Delta \alpha$ from target deceleration speed $\alpha 1$. In other words, at the time of a downhill slope, even when a strong brake based on target deceleration speed $\alpha 1$ is applied at time point t3, a possibility of a jerk occurring thereby is small. Therefore, target deceleration speed $\alpha 1$ is transmitted to brake ECU 24 as it is. In particular, when deceleration speed (difference) $\Delta \alpha$ is removed (canceled) from target deceleration speed $\alpha 1$ on a downhill slope, there is a risk that own vehicle 1 cannot be stopped at a target position. Therefore, the prohibition processing is effective. In particular, in large cars such as trucks, the vehicle weight is also heavy. Thus, it is preferred that the cancellation of deceleration speed (difference) $\Delta \alpha$ be prohibited at the time of a downhill slope.

<5-3> In the present embodiment, a case where vehicle 1 to which the driving assistance apparatus of the present invention is applied is a tractor capable of towing trailer 2 as a result of coupling trailer 2 to the tractor is described. However, the vehicle to which the present invention is applicable is not limited thereto and may be a vehicle such as a passenger car.

The present application is based on Japanese Patent Application (Japanese Patent Application No. 2020-033765) filed on Feb. 28, 2020, the entire content of which is incorporated herein by reference.

INDUSTRIAL APPLICABILITY

The driving assistance apparatus of the present disclosure is suitable for use as a driving assistance apparatus capable of suppressing a jerk by a simple configuration when ACC is performed.

REFERENCE SIGNS LIST

1 Vehicle
2 Trailer

3 Vehicle main-body portion
10 Driving system
11 Engine
12 Clutch
13 Transmission
14 Propeller shaft
15 Differential gear
16 Drive shaft
17 Wheel
18 Engine ECU
19 Motive power transmission ECU
20 Braking system
21 Service brake
22 Retarder
23 Exhaust brake
24 Brake ECU
30 Driving assistance apparatus
101 Inter-vehicle-distance detection section
102 Relative-speed detection section
110 Target-acceleration/deceleration-speed output section
111 Acceleration/deceleration-speed output section
112 Cancel section
113 Jerk map
114 Subtraction section

The invention claimed is:

1. A driving assistance apparatus for controlling operations of a driving system and a braking system of own car, the driving assistance apparatus comprising a processor configured to:

acquire an inter-car distance between the own car and a leading car;

acquire a relative speed between the own car and the leading car;

acquire a target acceleration/deceleration value of the own car on basis of the inter-car distance and the relative speed;

acquire a first target deceleration value by canceling a deceleration value that causes a jerk to occur from the acquired target deceleration value; and output the acquired target acceleration value and the first target deceleration value for controlling operations of the driving system and the braking system of the own car, in case a stopping leading car that enters a detection range from outside is detected during Adaptive Cruise Control (ACC), wherein the processor is prohibited from performing cancel processing in case of a downhill slope.

2. The driving assistance apparatus according to claim 1, wherein the processor includes a jerk map that stores therein a deceleration value for canceling the jerk that occurs in association with the deceleration value and the own car speed, and acquires the first target deceleration value by subtracting the deceleration value stored in the jerk map from the acquired target deceleration value.

3. The driving assistance apparatus according to claim 1, wherein cancel processing of the processor is performed when the leading car is being stopped.

4. The driving assistance apparatus according to claim 1, wherein cancel processing of the processor is performed when a brake force starts to work.

5. The driving assistance apparatus according to claim 1, wherein the processor, in case a stopping leading car that enters a detection range from outside is detected during ACC (Adaptive Cruise Control), performs ACC based on following equation:

$$D\text{start} = v^2/2\alpha_0 + D\text{stop}$$

where Dstart is an inter-car distance between the own car and the leading car at a start of deceleration, v is a own car speed, $\alpha_0$ is the acquired target deceleration value, Dstop is a target stopping inter-car distance between the own car and the leading car when the own car is stopped.

* * * * *